United States Patent
Yik (10) Patent No.: US 6,842,584 B2
(45) Date of Patent: Jan. 11, 2005

(54) DISENGAGEMENT MECHANISM FOR FILM PRE-LOADING AND FILM PRE-LOADING METHOD

(75) Inventor: Kai Chung Franco Yik, Yuen Long (CN)

(73) Assignee: Concord Camera Corp., Hollywood, FL (US)

(*) Notice: Subject to any disclaimer, the term of this patent is extended or adjusted under 35 U.S.C. 154(b) by 0 days.

(21) Appl. No.: 10/633,810

(22) Filed: Aug. 4, 2003

(65) Prior Publication Data

US 2004/0091258 A1 May 13, 2004

Related U.S. Application Data

(60) Provisional application No. 60/400,628, filed on Aug. 2, 2002.

(51) Int. Cl.$^7$ ................................................ G03B 17/02
(52) U.S. Cl. ........................................ 396/6; 396/396
(58) Field of Search ................................ 396/6, 396

(56) References Cited

U.S. PATENT DOCUMENTS

| | | | |
|---|---|---|---|
| 6,016,404 A | | 1/2000 | DiRisio |
| 6,038,402 A | * | 3/2000 | Horning et al. ............ 396/6 |
| 6,049,675 A | | 4/2000 | DiRisio et al. |
| 6,226,457 B1 | | 5/2001 | Boyd et al. |
| 6,360,061 B1 | * | 3/2002 | Schroder ................ 396/396 |
| 6,529,687 B1 | * | 3/2003 | Ping ...................... 396/6 |

* cited by examiner

Primary Examiner—David M. Gray
(74) Attorney, Agent, or Firm—Scott L. Lampert; Kerry Sisselman (57) ABSTRACT

A system and method for pre-loading film into a camera in non-darkroom conditions is provided. A fixture or tool is used to disengage the film metering system for pre-loading the camera with film. In one particular embodiment, the fixture is provided for simultaneously biasing the anti-reversal pawl away from the film advance wheel and disengage the release claw and striker from cams on the sprocket shaft to permit film pre-winding. The prongs of the fixture gain access to the assembled camera through a pair of holes through the front face of the camera.

20 Claims, 7 Drawing Sheets

DISENGAGEMENT MECHANISM FOR FILM PRE-LOADING AND FILM PRE-LOADING METHOD

PRIORITY

The present application claims priority from co-pending provisional patent application Ser. No. 60/400,628, Filed on Aug. 2, 2002 and entitled DISENGAGEMENT MECHANISM FOR FILM PRE-LOADING AND FILM PRE-LOADING METHOD.

FIELD OF THE INVENTION

The present invention relates to the field of cameras and, more particularly, to a disengagement system and method for pre-loading a camera with film.

BACKGROUND OF THE INVENTION

Inexpensive cameras, such as single use cameras, have been provided which are pre-loaded with film in the factory, optimally in non-darkroom conditions. In those cameras, the film has been drawn from the film cassette and the unexposed film is scrolled into a roll of unexposed film on a film spool located opposite the film cassette. An exposure chamber containing a shutter and lens mechanism is located in the film path between the film spool and the film cassette. The film cassette is loaded into the film cassette receiving chamber and engaged with the film advance wheel. The film leader is pulled from the film cassette, engaged with a sprocket, passed over the exposure chamber and is attached to the take-up spool. The film is then pre-wound onto the take-up spool.

Exposed film is rewound back into the film cassette by winding the advance wheel after an exposure has been made. After all exposures have been made, the film is completely rewound into the film cassette.

To prevent error by the user, an anti-reversal pawl mechanism is provided to ensure the advance wheel can only be turned in one direction by the user. However, this mechanism additionally prevents the advance wheel from being turned in a direction necessary for pre-loading the film on the take-up spool.

Several methods are known for disengaging an anti-reversal pawl mechanism and/or metering system for film pre-loading. U.S. Pat. No. 6,016,404 to DiRisio discloses a one-time-use camera with anti-backup pawl disengaged from the film winder during film loading. In the '404 DiRisio patent, an anti-backup pawl has a fair of flexible aligned fulcrum support connections with the main body part. An actuator at a free end of the anti-backup pawl protrudes into the film take-up chamber and is movable to disengage the anti-backup pawl from the thumbwheel in response to the film spool being received in the film take-up chamber such that the film spool is moved against the actuator. When the rotation tool is separated from the film spool the anti-backup pawl pivots to engage the pawl end with any of the teeth on the underside of the film winding thumbwheel and the actuator displaces the film spool from the film unwinding position in the film take-up chamber to a film winding position in the chamber. Similarly, U.S. Pat. No. 6,049,675 to DiRisio and Lawther discloses a one-time-use camera with anti-backup pawl engaging film winder responsive to film loading. In the '675 DiRisio patent the inherently flexible anti-backup pawl is a cantilever having a support end integrally connected with the main body part within a top hole in the main body part. The anti-backup pawl is inherently biased to urge a pawl end out of engagement with respective teeth on the underside of the film winding thumbwheel to allow unwinding rotation of the thumbwheel clockwise. An actuator proximate the support end of the anti-backup pawl protrudes into the film take-up chamber. When the actuator is pushed towards the top hole, the anti-backup pawl is pivoted at the support end to engage the pawl end with any one of the teeth to prevent unwinding rotation of the thumbwheel.

U.S. Pat. No. 6,038,402 to Homing and Rydelek discloses a method of disengaging the anti-backup pawl from the film winder to permit unexposed filmstrip to be pre-wound from the film cartridge during manufacture of a one-time-use camera. The '402 Homing patent discloses a single use camera including an anti-backup pawl located in a slot of the rear cover and having an integral pair of flexible fulcrum support connections with the rear cover in the slot. A free (movable) end of the anti backup pawl is located opposite one end of the slot. Another free (movable) end, i.e. the pawl end engages the thumbwheel to prevent its unwinding rotation. The fulcrum support connections are arranged between the free end and the pawl end in the slot to permit the anti-backup pawl to be pivoted at the fulcrum support connections to move the free end inwardly of the slot and to move the pawl end outwardly of the slot, in order to disengage the pawl end from the thumbwheel. The anti-backup pawl is disengaged by manually pushing a disengaging tool against the free end of the anti-backup pawl to pivot the anti-backup pawl at the fulcrum support connections and depress the free end inwardly of the slot and move the pawl end outwardly of the slot in order to disengage the pawl end from the thumbwheel. Additionally, the '402 Horning patent discloses a prior art method of manually disengaging the anti-backup pawl from the thumbwheel involving inserting a disengaging tool behind the anti-backup pawl and prying the anti-backup pawl outwardly from the thumbwheel.

U.S. Pat. No. 6,226,457 to Boyd et al. discloses a one-time-use camera loading method. The '457 Boyd patent discloses an anti-backup subsystem mounted on the camera frame assembly and having a first mechanical member biased into a disengaged position. A main portion of the filmstrip is then wound, in a pre-wind direction, from the film cartridge to a film supply chamber of the camera from assembly. Following the winding, the first mechanical member is biased into an engaged position, in which the anti-backup system precludes winding of the filmstrip in the pre-wind direction. The first mechanical member can be biased by applying a label to a casing of the camera.

What is needed is a simple system and method for pre-loading a camera. What is further needed is a special disengagement fixture used to disengage the metering system of the camera before the film pre-winding is performed. These objects, as well as others, are satisfied by the present inventions.

SUMMARY OF THE INVENTION

A system and method for pre-loading film into a camera in non-darkroom conditions is provided. A fixture or tool is used to disengage the film metering system for pre-loading the camera with film. In one particular embodiment, a fixture is provided for simultaneously biasing the anti-reversal pawl away from the film advance wheel and the release claw and striker away from the sprocket shaft to permit film pre-winding. The prongs of the fixture gain access to the sealed camera through a pair of holes through the front face of the camera.

Other objects and advantages of the present invention will become more readily apparent in the description that follows.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an exemplary embodiment that is presently preferred, it being understood however, that the invention is not limited to the specific methods and instrumentality's disclosed. Additionally, like reference numerals represent like items throughout the drawings. In the drawings.

DETAILED DESCRIPTION OF THE PREFERRED EMBODIMENTS

Before explaining the disclosed embodiments of the present invention in detail, it is to be understood that the invention is not limited in its application to the details of the particular arrangement shown since the invention is capable of other embodiments. Also, the terminology used herein is for the purpose of description and not of limitation.

The present invention relates to a system and method for preloading film in a camera. A tool, which is desirably a fixture on an assembly jig but may alternately be a handheld tool is passed through the cover of the camera to disengage the metering system and permit the film to be pre-wound prior to use. More specifically, in one particular embodiment, a pair of prongs on the disengagement tool are passed through openings on the front cover of the camera. A first prong disengages an anti-reversal pawl mounted on the body of the camera and normally engaged with the film advance wheel. The second prong is angled to bias the release claw and striker of the metering system away from cams on the sprocket shaft to permit the sprocket to rotate freely in both directions.

Referring now to FIGS. 1–8, there is shown a rear perspective view of a camera 10 having parts removed to more clearly show features of the film metering, anti-reversal and exposure subsystems. Camera 10 includes a main body portion 12 located between a front cover 14 and a rear cover 15. Main body portion 12 is molded to contain a film cassette receiving chamber 16 and a take-up spool chamber 18. The take-up spool chamber 18 is designed to receive a spool 20 therein. The bottom portion of the spool 20 includes a socket 22 designed to extend through the outer covers 14 and 15 and engage a rotatable tool 50 for pre-winding the film. One such film pre-winding method is described in U.S. Pat. No. 6,226,457, that patent being incorporated herein.

Figure 1:
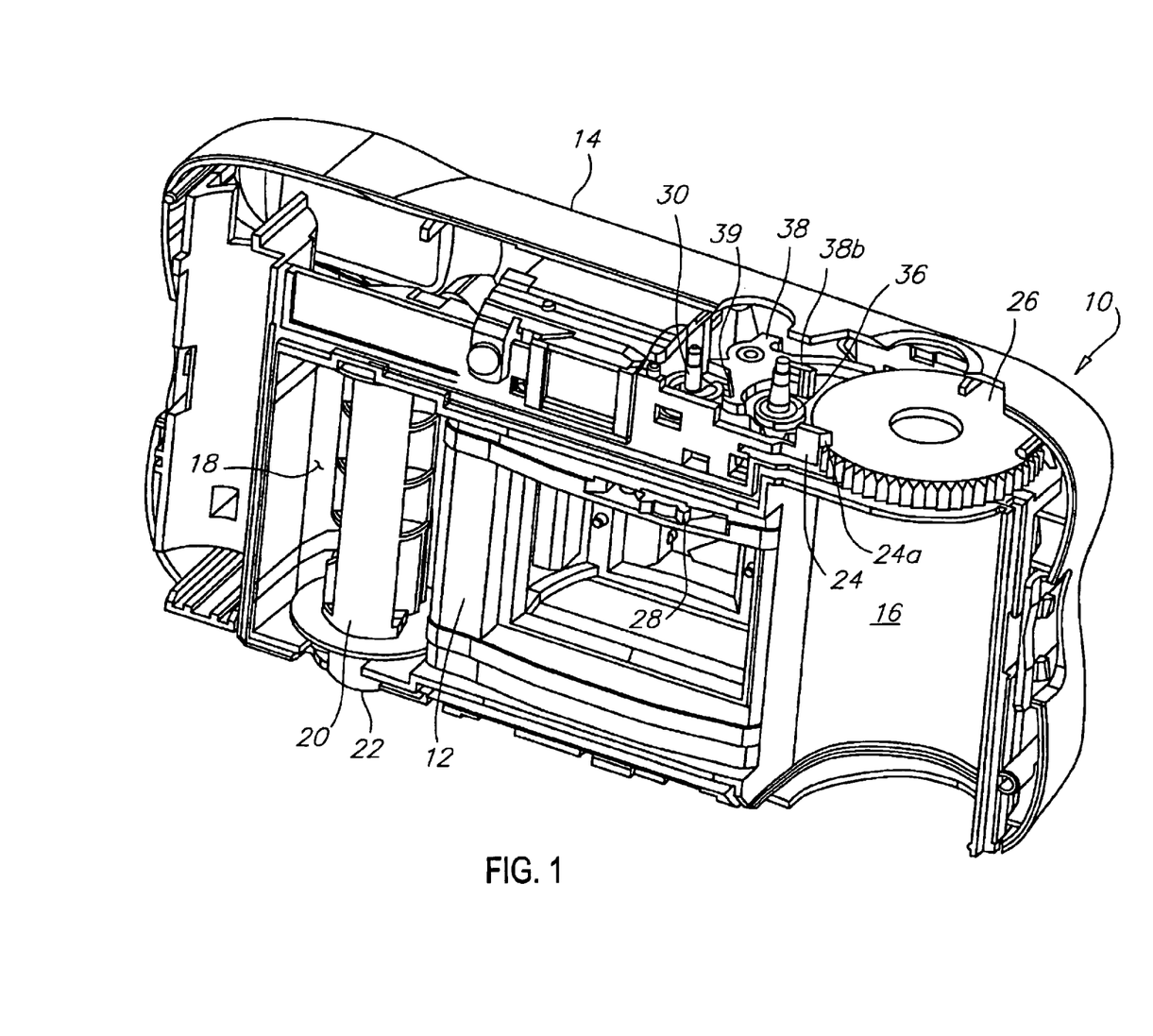
FIG. 1 is a rear perspective view of a camera having parts removed to more clearly show various subsystems of the camera.
Figure 2:
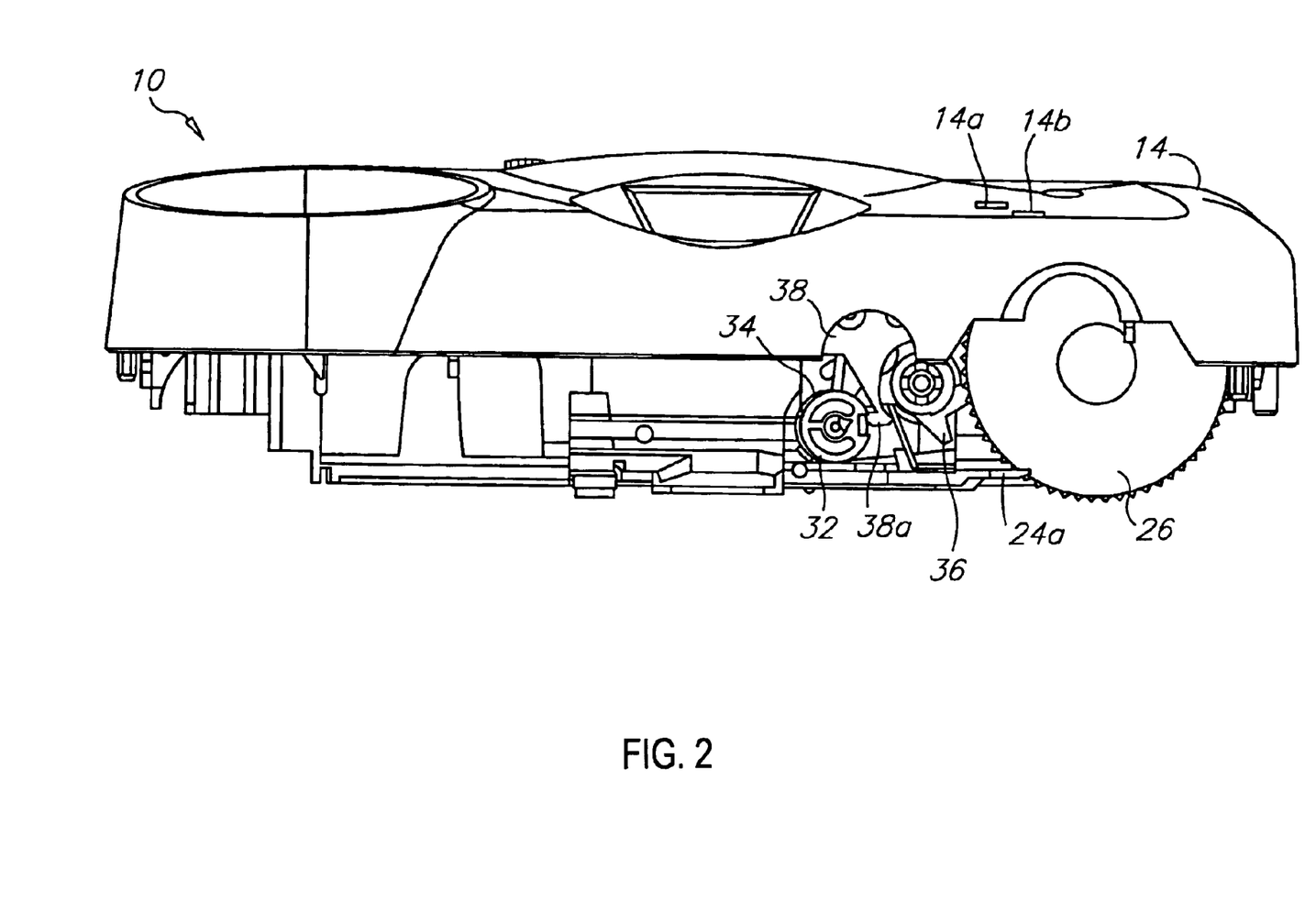
FIG. 2 is a top plan view of a camera having parts removed to more clearly show various subsystems of the camera.
Figure 3:
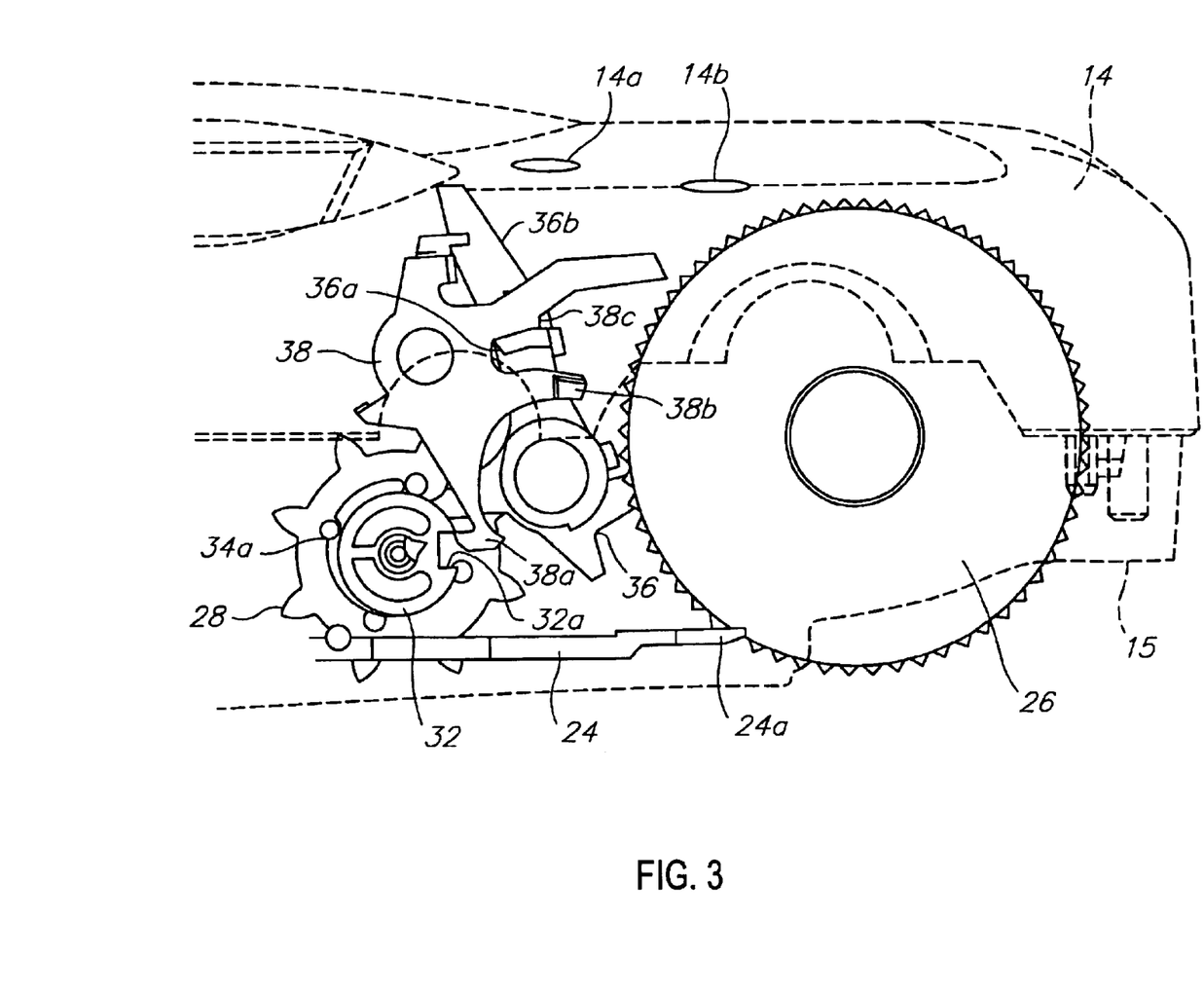
FIG. 3 is an enlarged portion of FIG. 2 with the cover shown in shadow and having the metering subsystem in its normal state.

Mounted on or integral with the body 12 are portions of the film transport and metering system, as well as the anti-reversal pawl 24. Anti-reversal pawl 24 is designed to engage with the teeth on the advance wheel 26 to permit winding in only the film advance direction. Attempting to wind the film in the pre-wind direction will cause the pawl end of the anti-reversal pawl 24 to lodge between adjacent teeth of the advance wheel 26 preventing movement of the advance wheel in that direction. Anti-reversal pawl 24 additionally includes a tab 24a which extends above the advance wheel 26, as will be described more fully herebelow.

A sprocket 28 extends into the film path through the main body 12 in order to engage the film. As shown more specifically in FIG. 8, the sprocket 28 is attached to a sprocket shaft 30. In one embodiment the sprocket shaft 30 connects to the sprocket 28 at a square hole formed in the sprocket 28. Additionally fixed to the sprocket shaft 30 are the primary cam 32 including a notch 32a and a secondary cam 34. Secondary cam 34 engages an extension of the striker 36 to rotate the striker 36 back to the charged position. The cams 32, 34 are secured to the shaft 30 and rotate with the sprocket 28, one revolution for each film frame.

Figure 8:
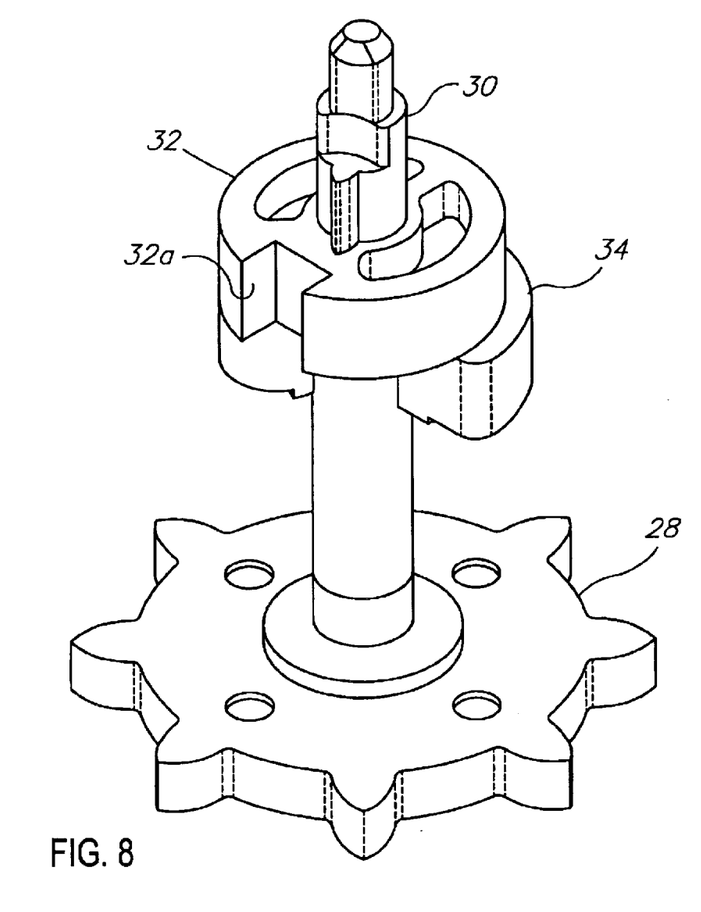
FIG. 8 is a perspective view of a sprocket shaft assembly useful with the present invention.

Additionally mounted on the main body 12 are the striker 36 and the release claw 38, both of which are spring biased into their normal positions. Release claw 38 includes, among other features, a follower portion 38a and a spur portion 38b. The striker 36 is engaged with the trigger button 37 and includes a tab 36a and a cam follower finger 36b. The release claw 38 is normally spring biased by spring 39 such that follower portion 38a follows the outer surface of the cam 32 and after a film frame exposure is wound into the film cassette (not shown). When the camera is readied for the next exposure, the follower finger 38a is forced all the way into the notch 32a and the striker tab 36a rests against the release claw shoulder 38c. However, the follower portion 38a is shaped to hook the edge of notch 32a to not permit rotation in the pre-winding direction, only in the winding direction (from the spool to the film cassette). Similarly, a finger 36b on the striker 36 hooks a notch 34a in the secondary cam 34 if the sprocket is rotated in the pre-wind direction, not permitting exposed film to be re-wound to the spool. Further, the advance wheel 26 may be turned in only a direction permitted by the anti-reversal pawl 24 to wind the film back into the film cassette (not shown).

In order to pre-wind the film onto the spool 20, the above mechanisms that prevent pre-winding of the film to the spool (striker finger 38b and release claw follower 38a limiting the direction of travel of the sprocket 28 and the anti-reversal pawl 24 limiting the direction of travel of the advance wheel 26) must be disengaged.

Figure 5:
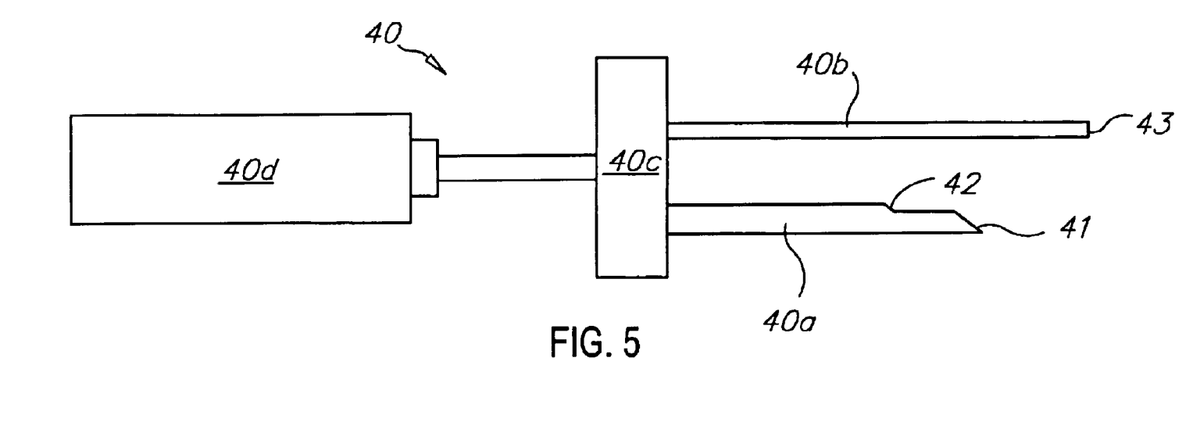
FIG. 5 is a side plan view of a tool in accordance with one embodiment of the present invention.
Figure 6:
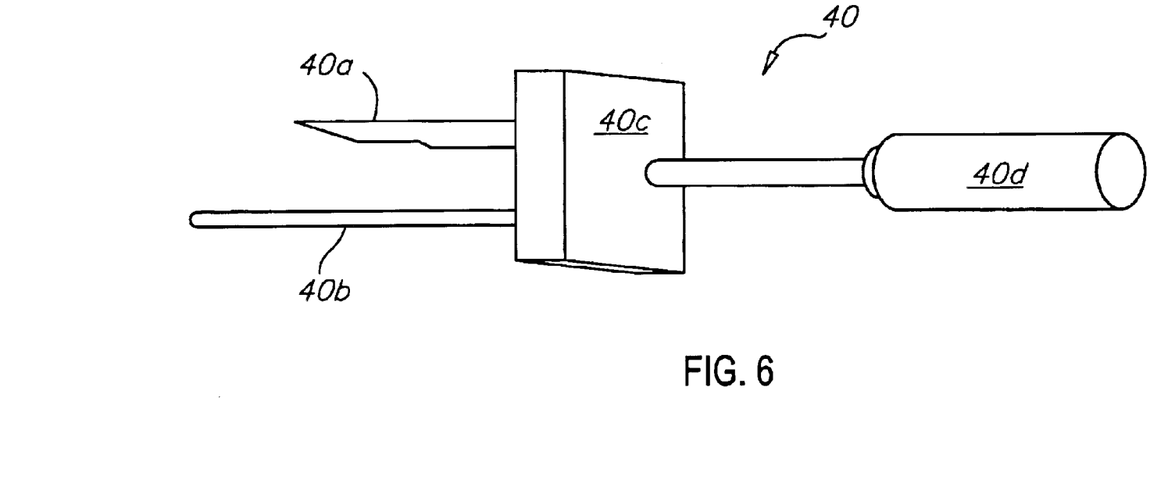
FIG. 6 is a rear perspective view of the tool of FIG. 5

Referring more specifically to FIGS. 5 and 6, a disengagement tool 40 is provided. The disengagement tool 40 includes the prongs 40a and 40b attached to the base portion 40c. A shaft 40d is connected to the base portion 40c. Shaft 40d may be a handle for manual manipulation, or may attach the base to a machine fixture for automated pre-winding of the film. Prongs 40a and 40b are dissimilar in structure and function. Prong 40*a* includes an angled tip 41 and an angled shoulder portion 42. Prong 40*b* includes a flat or slightly rounded tip 43.

In operation, the camera is pre-loaded with film in accordance with the present invention as follows. With the back cover off, the film counter is preset to a desired position as is known in the art, or as described in my co-pending, commonly assigned United States Patent Application entitled FILM COUNTER WHEEL AND METHOD FOR PRESETTING THE FILM COUNTER WHEEL DURING FILM PRE-LOADING, based from provisional patent application No. 60/400,917 and filed on even date herewith. Then a film cassette (not shown) is loaded into the film cassette receiving chamber 16. The film advance wheel 26 is engaged with the top of the film cassette for film re-winding by the consumer. A film leader (not shown) extending from the film cassette is engaged with the sprocket 28. A film take-up spool 20 is located in the film take-up spool chamber 18. The film leader is engaged with the film take-up spool 20. At this time the rear cover 15 is connected with the front cover 14 to form a light-tight barrier surrounding the film.

Figure 4:
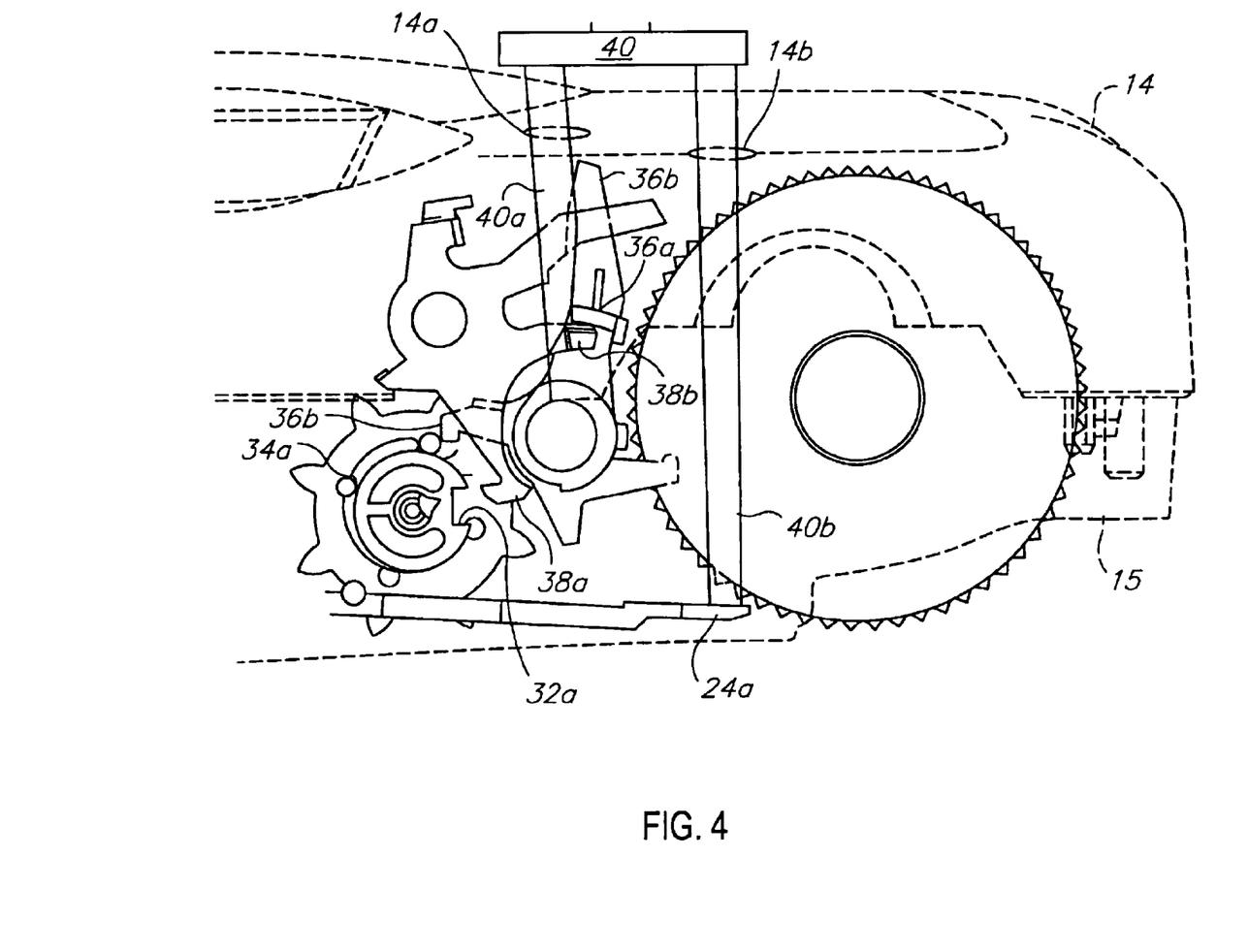
FIG. 4 is an enlarged portion of FIG. 2 with the cover shown in shadow and having the metering subsystem disengaged by a tool in accordance with one embodiment of the present invention.
Figure 7:
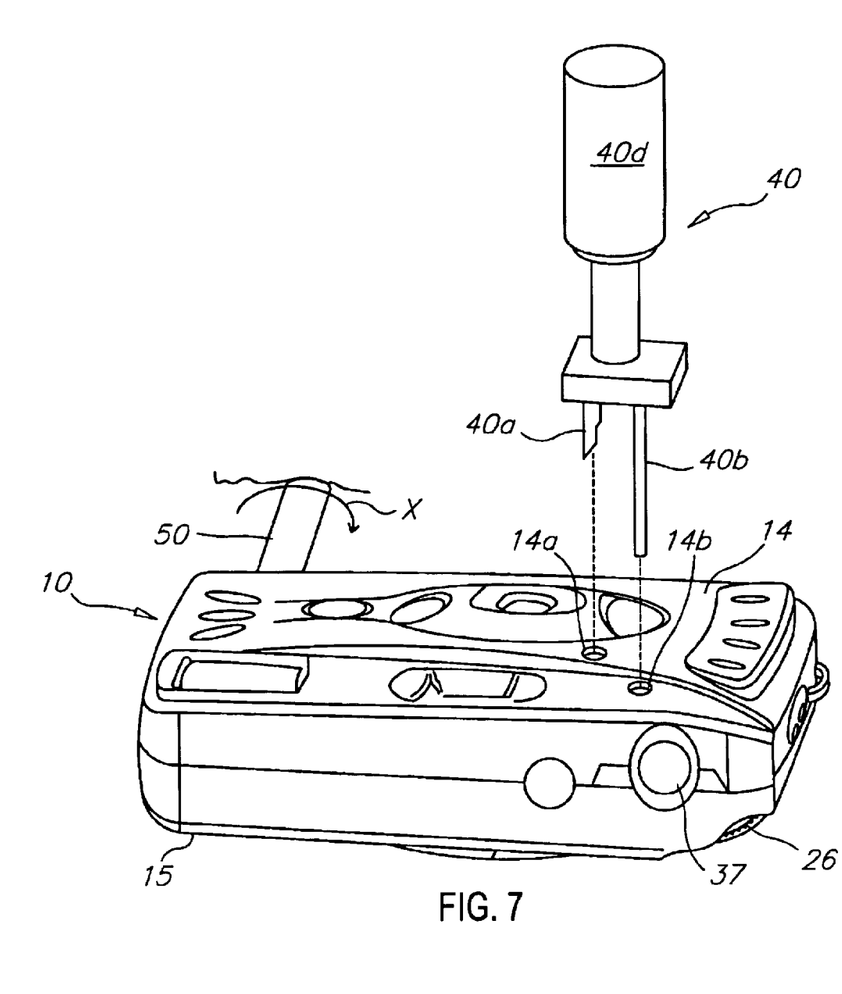
FIG. 7 is a perspective view of a camera being readied for preloading in accordance with the present invention.

As shown more particularly in connection with FIGS. 4 and 7, the camera may be placed on a jig or fixture (not shown) that automatically aligns the prongs 40*a*, 40*b* of the tool 40 with holes 14*a*, 14*b* through the front cover, respectively. Alternately, tool 40 may be used by hand. Additionally, a rotatable winding tool 50 is engaged with the socket 22 of the film take-up spool 20 either as part of an automated fixture, or by hand.

The prongs 40*a* and 40*b* of the disengagement tool 40 are passed through holes 14*a* and 14*b* of the front cover 14. Prong 40*b* passes over the film advance wheel 26 and the tip 43 engages the upper tab 24*a* of the anti-reversal pawl, pushing the pawl edge of the anti-reversal pawl 24 out of contact with the teeth of the advance wheel 26. This permits the advance wheel 26 to be freely rotated in either direction. Simultaneously, the angled end 41 of prong 40 contacts the spur portion 38*b* of the release claw 38, moving the follower portion 38*a* out of contact with the sprocket primary cam 32. The inner surface of the prong 40*a* additionally pushes the striker 36*a* to the side, thus taking the striker finger 36*b* out of contact with the sprocket secondary cam 34. Free of the follower portion 38*a* and the striker finger 36*b*, the sprocket may additionally travel freely in either the pre-winding or the film advance directions.

Once the disengagement tool 40 is in place as described, the rotatable tool 50 rotates in the pre-wind direction shown by arrow "x", and the film is wound onto the take-up spool 20. Through the use of the disengagement tool 40, the film may be pre-wound after full camera assembly and under non-darkroom conditions. After pre-winding, the tools 40 and 50 are removed, the holes 14*a*, 14*b* may be covered by a decorative label or cardboard, if desired, rendering the camera 10 ready for use.

While the invention has been described with reference to certain embodiments, it will be understood by those skilled in the art that various changes may be made and equivalents may be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for winding film in a camera, comprising:
    a camera, including:
        a front cover including an opening therethrough;
        a rear cover matingly engaged with said front cover to form a camera housing;
        a camera body encapsulated between said front cover and said rear cover, said camera body including at a first end a film cassette chamber and at a second end a film roll chamber;
        a winding wheel rotatably engaged with said camera body proximal to said film cassette chamber and normally rotatable in two directions, a portion of said winding wheel being accessible through said camera housing;
        an anti-reversal pawl including a fixed end and a free end, said fixed end being fixed proximal to said rear cover, said free end being normally biased to engage said winding wheel and limit rotation of said winding wheel in one direction, at least a portion of said free end being aligned with said opening; and
    a tool including a pawl engaging member sized to pass through said opening in said front cover and bias said free end of said anti-reversal pawl out of engagement with said winding wheel to permit movement of said winding wheel in both directions.

2. The system of claim 1, wherein said fixed end is fixed to said camera body proximal said rear cover.

3. The system of claim 1, additionally including a web of film anchored to a film cassette loaded into said film cassette chamber of said camera, wherein said web of film is advanced or withdrawn from one side of said camera body to the other side by rotation of said winding wheel.

4. The system of claim 3, wherein said web of film is pre-wound into a roll inside said film roll chamber prior to use by a consumer, and wherein said anti-reversal pawl is normally biased to permit the winding wheel to rotate only in a first direction to advance said web of film into said cassette when said winding wheel is rotated.

5. The system of claim 4, wherein said tool is used to push said free end of said anti-reversal pawl away from said front cover and out of engagement with said winding wheel to permit said web of film to be pre-wound.

6. The system of claim 5, wherein said free end of said anti-reversal pawl includes a tab that extends above said winding wheel, wherein said pawl engaging member passes through said opening and engages said tab to push said free end.

7. The system of claim 6, wherein said tool is handheld.

8. The system of claim 6, wherein said camera additionally includes a film sprocket assembly rotatably engaged to said camera body and additionally engageable with said web of film, said film sprocket assembly releasably locking in response to said winding wheel advancing one frame of film into said cassette, wherein said front cover includes a second opening and said tool includes a sprocket release member sized to pass through said second opening and release said sprocket for free rotation depending upon the direction of travel of said web of film engaged with said film sprocket.

9. The system of claim 8, wherein said camera additionally includes a release claw pivotally engaged with said camera body, said release claw engageable with said film sprocket assembly to lock said film sprocket in response to said winding wheel advancing one frame of film into said cassette, a portion of said release claw being aligned with said second opening and engageable with said sprocket release member to release said film sprocket for free rotation.

10. The system of claim 9, wherein said release claw includes a projection aligned with said second opening, wherein when said sprocket release member is passed through said second opening and engaged with said projection, said release claw is pivoted out of engagement with said film sprocket, permitting said film sprocket to rotate without locking.

11. The system of claim 10, wherein said pawl engaging member is located on said tool in parallel with said sprocket release member.

12. The system of claim 11, wherein said tool is handheld.

13. A method for winding film in a camera, comprising:
   (a) providing a camera, including:
      a front cover including an opening therethrough;
      a rear cover matingly engage with said front cover to form a camera housing;
      a camera body encapsulated between said front cover and said rear cover, said camera body including at a first end a film cassette chamber and at a second end a film spool chamber;
      a winding wheel rotatably engaged with said camera body proximal to said film cassette chamber and normally rotatable in two directions, a portion of said winding wheel being accessible through said camera housing;
      an anti-reversal pawl including a fixed end and a free end, said fixed end being fixed proximal to said rear cover, said free end being normally biased to engage said winding wheel and limit rotation of said winding wheel in one direction, at least a portion of said free end being aligned with said opening; and
   (b) loading a web of film into said camera, said web of film anchored to a film cassette loaded into said film cassette chamber;
   (c) providing a tool including a pawl engaging member sized to pass through said opening in said front cover and bias said free end of said anti-reversal pawl out of engagement with said winding wheel to permit movement of said winding wheel in both directions; and
   (d) inserting said pawl engaging member of said tool through said opening in said front cover and biasing said anti-reversal pawl away from said winding wheel; and
   (e) winding said film after steps (a)–(c) and during step (d).

14. The method of claim 13, wherein said camera additionally includes a film spool located in said camera body, opposite said film cassette, said film spool including a winding socket accessible through said housing, wherein the free end of said web of film is attached to said film spool prior to closing said housing and wherein said winding step is performed by inserting a spindle into said winding socket and winding said web of film onto said spool while said anti-reversal pawl is disengaged from said winding wheel.

15. The method of claim 14, wherein said camera additionally includes a film sprocket assembly rotatably engaged to said camera body and additionally engageable with said web of film, said film sprocket assembly releasably locking in response to said winding wheel advancing one frame of film into said cassette, wherein said front cover includes a second opening and said tool includes a sprocket release member sized to pass through said second opening during said inserting step and release said sprocket for during said winding step.

16. The method of claim 15, wherein said camera additionally includes a release claw pivotally engaged with said camera body, said release claw engageable with said film sprocket assembly to lock said film sprocket in response to said winding wheel advancing one frame of film into said cassette, a portion of said release claw being aligned with said second opening and engageable with said sprocket release member during said inserting step to release said film sprocket for free rotation during said winding step.

17. The method of claim 16, wherein, said tool biases said anti-reversal pawl by pushing said free end away from said front cover.

18. A system for pre-winding film in a single-use camera, comprising:
   a camera, including:
      a front cover including first and second openings therethrough;
      a rear cover matingly engaged with said front cover to form a camera housing;
      a camera body encapsulated between said front cover and said rear cover;
      a winding wheel rotatably engaged with said camera body, a portion of said winding wheel accessible through said camera housing;
      an anti-reversal pawl including a first end fixed to said camera body proximal to said rear cover, and a free end normally biased to engage said winding wheel to limit rotation of said winding wheel in one direction, at least a portion of said free end being aligned with said first opening;
      a web of film connected at one end to a film cassette in communication with said winding wheel and connected at the other end to a film spool;
      a film sprocket assembly engaged with said web of film between said film cassette and said film spool, said film sprocket assembly including a film sprocket and a locking member, said locking member for periodically locking said film sprocket after a predetermined length of film has been advanced, a portion of said locking member being aligned with said second opening;
   a tool including a pawl engaging prong and a locking member engaging prong sized to pass through said first and second openings, respectively, to simultaneously bias said free end out of engagement with said winding wheel and said locking member away from said film sprocket to permit free movement of said winding wheel and said film sprocket during film pre-winding.

19. The system of claim 18, wherein said pawl engaging prong pushes said free end towards said back cover.

20. The system of claim 19, wherein said film spool includes a socket accessible from outside the housing, and the film is pre-wound using said socket while said tool is passed through said front cover.

* * * * *